United States Patent

Camras

[15] 3,686,436

[45] Aug. 22, 1972

[54] MULTIPLE VIDEO SIGNAL TRANSDUCING SYSTEM AND METHOD

[72] Inventor: Marvin Camras, Glencoe, Ill.

[73] Assignee: IIT Research Institute, Chicago, Ill.

[22] Filed: Dec. 30, 1969

[21] Appl. No.: 889,222

[52] U.S. Cl.......178/6.6 SF, 178/6.7 A, 178/DIG. 23, 179/100.2 MD

[51] Int. Cl...........................G11b 21/00, H04n 5/76

[58] Field of Search.........178/6.6 A, 6.6 SF, 5.4 CD, 178/6.5, 6.7 A, DIG. 23; 179/100.2 MD

[56] References Cited

UNITED STATES PATENTS

| | | | |
|---|---|---|---|
| 3,539,712 | 11/1970 | Stephens | 178/5.4 CD |
| 3,359,365 | 12/1967 | Kihara | 178/5.4 CD |
| 3,392,233 | 7/1968 | Houghton | 178/6.6 A |
| 3,283,068 | 11/1966 | Urry | 178/6.6 A |

*Primary Examiner*—Howard W. Britton
*Attorney*—Hill, Sherman, Meroni, Gross & Simpson

[57] ABSTRACT

Method and apparatus for transducing a plurality of video signals on a record medium by interlacing recorded fields of different signals along a channel, and using a series of scanners or a scanner with shiftable scanning beam for repeatedly reproducing each recorded field, or using a scanner and a repeater device to reproduce and repeat each recorded signal, and thus provide for display of a continuous sequence of fields, while using much less record medium for a given program.

10 Claims, 8 Drawing Figures

INVENTOR.
Marvin Camras
BY
ATTORNEYS

INVENTOR
Marvin Camras

BY Hill, Sherman, Meroni, Gross & Simpson ATTORNEYS

MULTIPLE VIDEO SIGNAL TRANSDUCING SYSTEM AND METHOD

SUMMARY OF THE INVENTION

The present invention relates to methods and apparatus for transducing multiple video signals, and particularly relates to transducing of plural video signals with respect to a given channel on a moving record medium.

It is an object of the present invention to provide a method and apparatus for transducing an increased number of video signals on a given length of record medium, and/or eliminating the necessity for a separate rewinding operation.

It is another object of the invention to provide a system and method for transducing a plurality of video signals so as to greatly reduce the cost of prerecorded record media for amateur and general home use.

Another important object of the present invention is to provide a particularly economical video reproducing system for reproducing prerecorded records which system is of unique simplicity.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure.

DETAILED DESCRIPTION OF THE PREFERRED EMBODIMENTS

Figures 1, 2, 3:
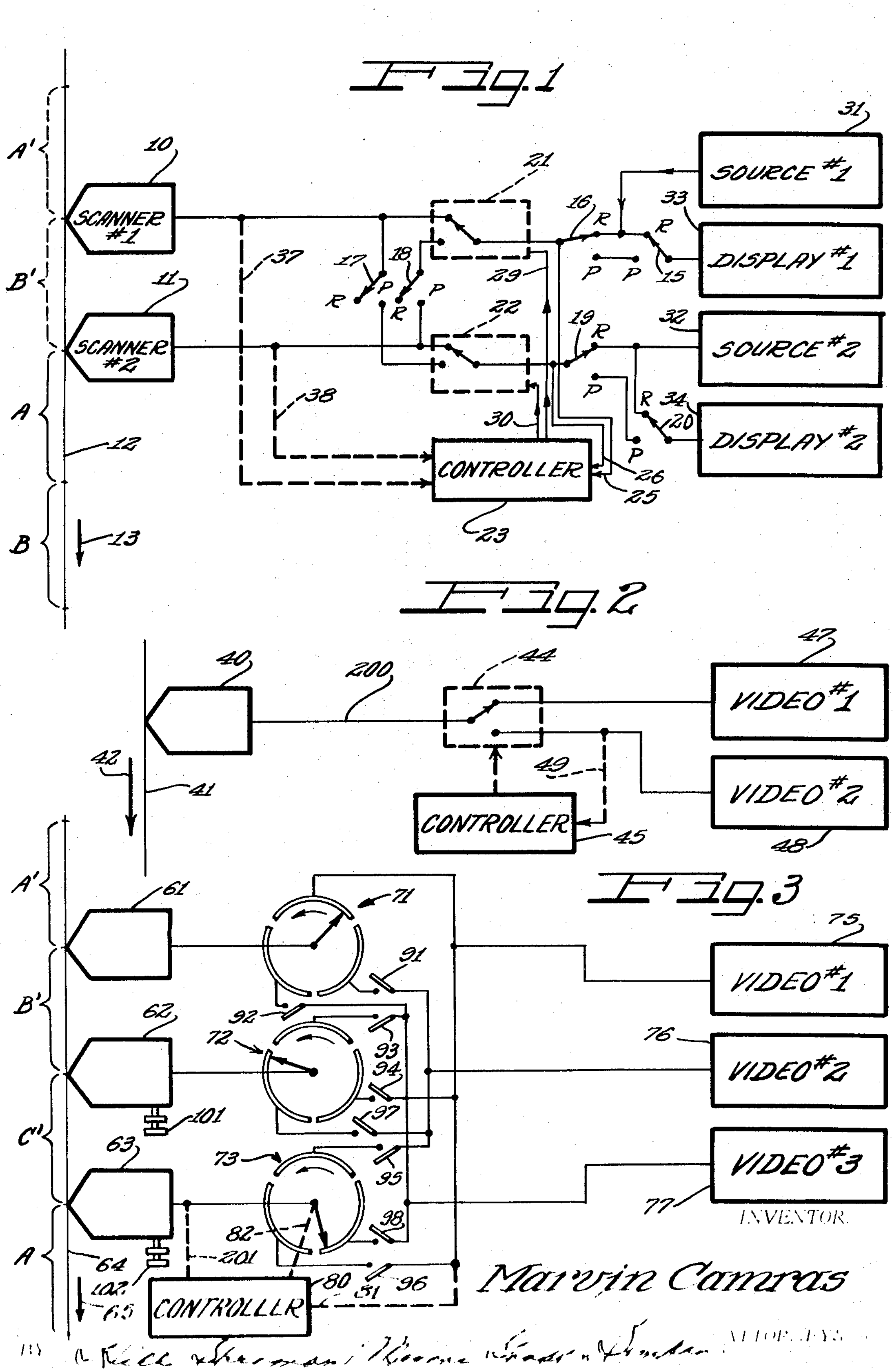
FIG. 1 is a somewhat diagrammatic illustration of a recording system and method in accordance with the present invention for recording two different video signals along a single channel of a record medium.
FIG. 2 is a somewhat diagrammatic illustration of a simplified recording system for recording two different video signals; or for reproducing them under certain conditions.
FIG. 3 is a somewhat diagrammatic illustration of a system for recording or reproducing three video signals along the length of a single channel of a record medium.

FIG. 1 illustrates a transducing system wherein a pair of scanners 10 and 11 are adapted in scanning relation to the same channel of a record medium 12 moving in the direction of arrow 13. Selector switches 15–20 are shown in their record (B) positions. Electronically controlled switching means are diagrammatically indicated at 21 and 22. A conventional controller circuit is indicated at 23 for receiving synchronizing pulses via input lines 25 and 26, and for controlling the respective switches 21 and 22 via control output lines indicated in 29 and 30. The controller 23 may consist of an input lead such as 25, a video amplifier and a vertical sync separator as found in conventional television receivers such as the Zenith 14L30 chassis. The vertical pulses of the signal supplied at input line 25 are separated by means of the vertical sync separator and supplied to trigger a toggle type of flip-flop circuit within controller 23 which changes from a logical "zero" to a logical "one" or vice versa every time a vertical pulse is received at the input to the flip-flop circuit. The flip-flop circuit output activates gates represented at 21 and 22 in FIG. 1, which gates and their logic connections for this function are well known in elementary computer circuitry. Reference is made to my copending application Ser. No. 545,050 filed Apr. 25, 1966, now U.S. Pat. No. 3,484,546, showing logical AND gates for color signal switching. The disclosure of this copending application is incorporated herein by reference.

In recording mode, source 31 is intermittently connected with scanner 10 by means of electronic switch 21, while source 32 is intermittently connected by means of electronic switch 22 with scanner 11. Display component 33 is shown as being coupled with source 31 via selector switch 15 in recording mode for monitoring the signal being recorded.

In playback position (P) of selector switches 15–20, and with the illustrated positions of electronic switches 21–22, scanner 10 is connected with display 33 while scanner 11 is connected with display component 34. When the electronic switches 21 and 22 are shifted to their alternate positions, scanner 10 is connected with display 34 via selector switch 17, electronic switch 22, and selector switches 19 and 20. Similarly, scanner 11 is connected with display 33 via selector switch 18, electronic switch 21, and selector switches 16 and 15.

In operation of the embodiment of FIG. 1, during recording, source 31 may supply successive fields of one video signal, while source 32 may supply successive fields of a second video signal, the vertical synchronizing pulses between the successive fields serving to actuate controller 23 via input lines 25 and 26. The record medium 12 may be driven in the direction of the arrow 13 at a constant speed by means of any suitable drive. Thus, while scanner 10 is recording a first field of the first video signal (corresponding to about 262.5 horizontal lines in standard broadcast television in the U.S.A.) at the region marked A on the record medium 12, the scanner 11 will record a first field of the second video signal at the region indicated at B on the record medium 12. The vertical synchronizing pulses following the first fields of the respective signals will cause controller 23 to shift switches 21 and 22 to their alternate positions, so that the region marked A on the record medium 12 moves past the scanner 11 while the scanner 11 is deenergized, and the region marked B' moves past the scanner 10 while the scanner 10 is deenergized. The second fields from the sources 31 and 32 are thus not recorded, but the vertical synchronizing pulses following the second fields of the respective signals cause the electronic switches 21 and 22 to return to their positions indicated in FIG. 1, whereupon the third fields of the respective signals will be recorded at the regions indicated at A' and B' on the record medium 12. Operation during recording continues in this manner to record the alternate fields of each signal in an interleaved manner along the record medium.

During playback operation, the record medium 12 is again moved at constant speed in the direction of the arrow 13, scanner 10 reproducing the first field of the first signal recorded at A, while scanner 11 reproduces the first field of the second signal recorded at B. The reproduced vertical synchronizing pulses following the first recorded fields at A and B may be transmitted via input lines 37 and 38 to controller 23, so as to then actuate switches 21 and 22 to their alternate positions. Accordingly, scanner 11 will now scan the first recorded line at A, and transmit the same to display 33 via selector switch 18 and electronic switch 21, while scanner 10 will be scanning the third recorded field at B' and supplying the same to display 34 via selector switch 17 and electronic switch 22. The result is that each recorded field of the first signal is reproduced in succession by scanners 10 and 11 and supplied to display 33, and each recorded field of the second video signal is successively scanned by scanners 10 and 11 and supplied to the display 34.

It is found that this transducing system while doubling the number of programs which can be stored on the record medium still is capable of displaying an image which is substantially free of flicker and wherein motion of the displayed image is essentially smooth.

FIG. 2 illustrates a simplification of the embodiment of FIG. 1 wherein a single scanner 40 is disposed in scanning relation to a record medium 41 moving in the direction indicated by arrow 42. The scanner is connected with an electronic switch 44 which is controlled by means of conventional controller circuit 45 so as to alternately connect the scanner 40 with video components 47 and 48. During recording operation the first field of the signal from source 47 is supplied to scanner 40 and recorded along a segment of the record medium 41 such as that represented at A in FIG. 1. The vertical synchronizing pulse at the end of the first field supplied by source 48 is transmitted via input line 49 to controller 45 causing electronic switch 44 to then assume its alternate position. Video source 48 then supplies a second field of the second signal to scanner 40 for recording along the record medium 41 at a region such as indicated at B' in FIG. 1. The vertical synchronizing pulse following the second field is supplied via input 49 to controller 45 to return electronic switch 44 to the switching position indicated in the drawing, whereupon the third field of the signal from source 47 is supplied to scanner 40 for recording at a region of the record medium 41 such as indicated at A' in FIG. 1. Using the notation A1 to signify a first recorded field from source 47, the notation B2 to signify a second recorded field from source 48 and the notation A3 to designate the third recorded field from source 47, the sequence of recorded fields along the record medium 41 is represented by the series A1, B2, A3, B4, A5, and so on. A record medium 41 with this recorded sequence thereon could be reproduced by the system of FIG. 2 by electronically repeating the record fields of the respective signals in components 47 and 48. The reproduced electrical video signals would then be represented as A1, A1, A3, A3, A5, A5 . . . in component 47, and B2, B2, B4, B4, B6, B6 . . . in component 48.

A convenient repeater would be magnetic disc that records a field, reproduces it 1/60th of a second later, and then erases it so that a new field can be recorded during the next revolution. Where the record and reproduce heads are separated by 180° about the disk periphery, the disk can make 30 revolutions per second.

Using a similar notation with respect to the embodiment of FIG. 1, the record medium 12 has a series of recorded fields which may be represented as B1, A1, B3, A3, B5, A5 . . . Reproduction of the recorded signals on the record medium 12 would provide reproduced electrical signals at display components 33 and 34 represented as A1, A1, A3, A3, A5, A5 . . . and B1, B1, B3, B3, B5, B5 . . . respectively.

FIG. 3 illustrates a transducer system similar to that of FIG. 1, but wherein three scanners 61–63 are disposed in scanning relation with respect to the same channel of a record medium 64 moving in the direction of arrow 65 at constant speed. Electronic distributor switches are diagrammatically indicated at 71–73 for sequentially connecting each of the scanners 61–63 with respective video components 75, 76 and 77. A conventional controller circuit is indicated at 80 for receiving an input as indicated at 81 and for supplying an output as indicated at 82 to control and synchronize the operation of the distributor means 71–73. The conventional controller circuit 80 may be as described with respect to the embodiment of FIG. 1 for controller 23 except that a three position ring counter is used in place of the two position toggle flip-flop circuit, and the logic gates are adjusted appropriately.

During recording operation, switches 91–96 are open, but switches 97 and 98 are closed so that scanner 61 receives every third field of a first video signal from component 75, scanner 62 receives corresponding fields of a second signal from component 76, and scanner 63 receives corresponding fields of a third signal from component 77. Thus, with the condition of the distributor 71–73 diagrammatically indicated in FIG. 3, scanners 61–63 will record respective fields such as that indicated at region A of record medium 64; after which the field A, for example, will move past scanners 62 and 63 while these scanners are inactive. With the distributor 71–73 again at the position shown in FIG. 3, scanners 61–63 will be energized to record respective third fields from components 75–77 at regions such as indicated at A', B' and C', respectively on the channel of the record medium 64. Recording operation would continue in this manner with every third field of the respective signals recorded in interleaved relation along the length of the record medium 64. Referring to the notation for recorded fields as given with respect to FIG. 2, the sequence of recorded fields on the record medium 64 would be C1, B1, A1, C4, B4, A4, C7, B7, A7, and so on. The vertical synchronizing pulses supplied by component 75 would be delivered to controller 80 via conductor 81 so as to maintain synchronism of the distributor components 71—73.

During playback operation, all of the switches 91–98 would be closed, so that the recorded field at region A, for example, would be reproduced in succession by scanners 61–63, with each such reproduced field being supplied to the video component 75. Similarly, each reproduction of the recorded field at region B′ would be supplied to video component 76, and each reproduction of the recorded field at region C′ would be supplied to video component 77. Using the notation for recorded fields previously referred to, component 75 would receive reproduced fields A1, A1, A1, A4, A4, A4, A7, A7, A7, and so forth. It has been found that such a reproduced sequence of repeated fields while enabling the recording of three times as many programs on the record medium, still is capable of displaying an image which is substantially free of flicker and wherein motion of the displayed image is essentially smooth, especially if the time interval between A1, A4, A7, etc., is 1/15 second or less.

Adjustment screws are diagrammatically indicated at 101 and 102 for adjusting the longitudinal positions of scanners 62 and 63 relative to scanner 61. The adjusting screws 101 and 102 thus change the longitudinal position of scanners 62 and 63 so as to compensate for tape shrinkage or variations between one recorder and another, or to adjust interlacing of the fields.

Figures 4, 5, 6:
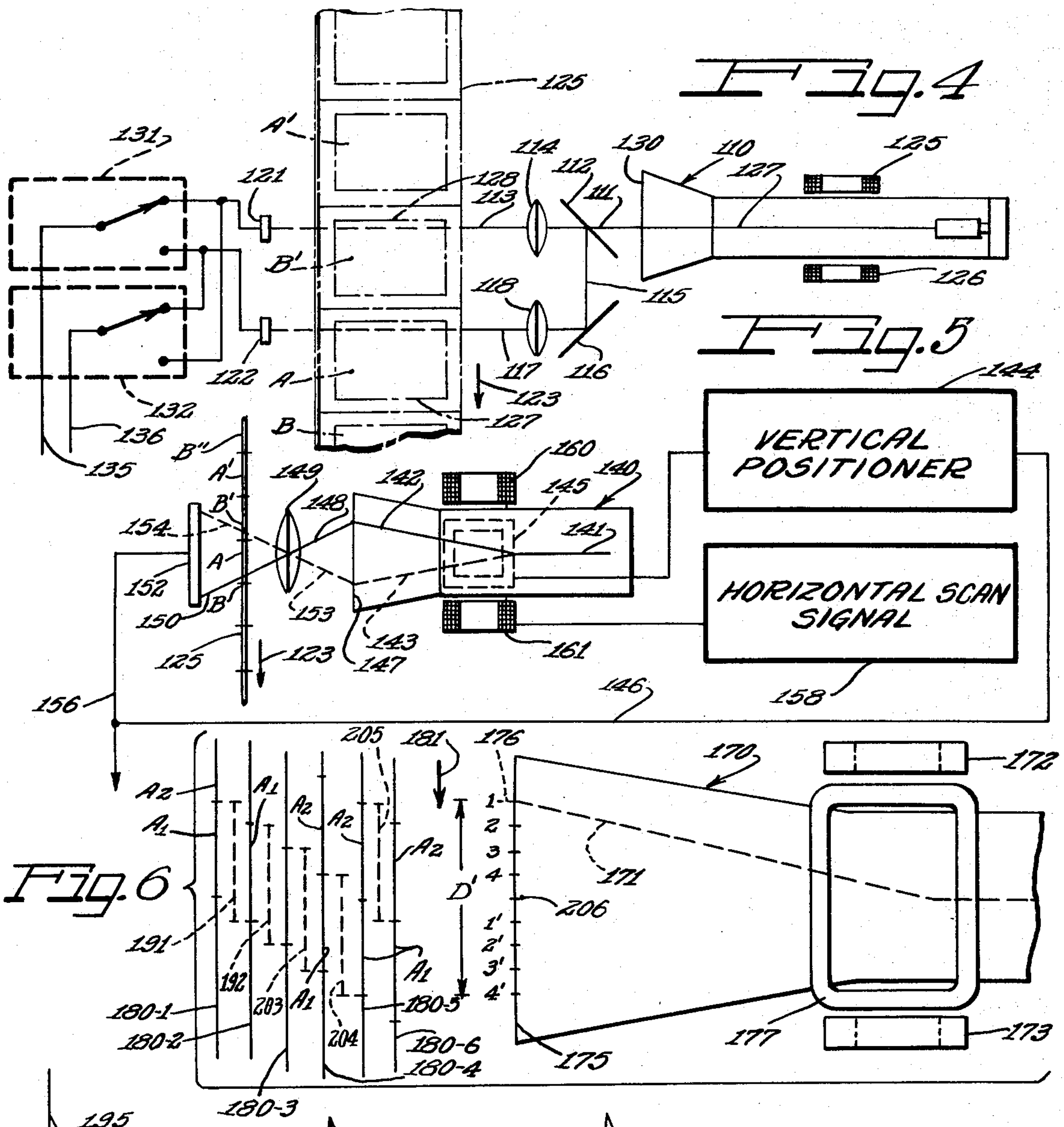
FIG. 4 is a somewhat diagrammatic illustration of a transducing system for reproducing video signals in accordance with a recorded sequence of two dimensionally continuous images relating to a plurality of different events, the record medium being shown rotated through 90° so as to be viewed in side elevation.
FIG. 5 is a somewhat diagrammatic illustration of a transducer system for producing an electric signal in accordance with a selected one of a plurality of signals recorded as two dimensionally continuous images on a record medium.
FIG. 6 is a diagrammatic illustration of a further transducing system for producing electrical signals in accordance with two dimensionally continuous recorded images wherein the record medium may move at one fourth it normal speed.

FIG. 4 illustrates diagrammatically an optical transducer system including an optical transducer 110 for transmitting a light beam as indicated at 111. The path of the light beam is split by means of a partially reflecting mirror 112, with a first beam path 113 being through a lens 114, and with a second beam path 115 impinging on a reflecting mirror 116 and then traveling parallel to path 113 as indicated at 117 through a lens 118. The scanning beams transmitted along paths 113 and 117 impinge on respective photocells 121 and 122 which in the illustrated embodiment are located on the opposite side of a record medium path indicated by arrow 123. In the illustrated embodiment, the beam 111 is cyclically scanned in a horizontal plane by means of horizontal deflecting coils indicated at 125 and 126 which operate on an electron beam 127 of circular cross section within the transducer 110. The transducer 110 includes an end wall 130 of a fast decay time phosphor material which is operative to emit a pencil beam of light in response to impingement of the electron beam 127. The optical elements 112, 114, 116 and 118 and the photocells 121 and 122 are, of course, horizontally elongated so as to properly accommodate a uniform scanning operation along the beam paths 113 and 117.

With the arrangement of parts shown in FIG. 4, the record medium would be viewed edgewise, with its width dimension arranged normal to the plane of FIG. 4. For diagrammatic purposes, however, a record is indicated in dot-dash outline at 125, rotated 90° from its correct relative orientation so as to illustrate a flat surface thereof. On the flat surface are indicated continuous photographic or optical images such as that designated by the reference numeral 127 in region A of the record medium. These images have been produced by a photographic process in which the complete image is transferred as a unit, as distinct from an raster type recording process. As shown at 127 and 128 in FIG. 4, the recorded complete picture frames or images have an area configuration or format. The scanning of the record is such that the beam at path 113 traces horizontal lines on an image 128 which lines are interleaved with the scanning lines later generated at beam path 117 with respect to this same image. In other words, if the frames 127 and 128 have a center to center separation D, the paths 113 and 117 have a separation d which differs from the frame separation D by half the separation between successive scanning lines generated at the beam path 113, for example. If the horizontal scanning period of electron beam 127 is represented by $h$, and the velocity of the record medium 125 is represented by $v$, then the spacing between successive scanning lines traced on the record medium at the path 113 will equal to the product of $h$ and $v$, and the separation between the paths 113 and 117 will be equal to D plus $h \cdot v/2$ or D minus $h \cdot v/2$.

During operation of the embodiment of FIG. 4, electron beam 127 is cyclically deflected in a horizontal plane (perpendicular to the plane of FIG. 4) to cause pencil type light beams to cyclically scan across the width of the record medium 125. The spacing of the scanning beam at paths 113 and 117 is such that the beam at path 113 scans one set of lines on image 128, for example; after which the beam at path 117 scans an interlaced series of lines on the image 128. In effect, the output of photocell 121 is then a first video field signal, consisting of a series of lines such as the conventional approximately 262.5 lines of standard U.S. broadcast television, while the subsequent output of photocell 122 is a similar but interlaced type second field signal, the two field signals together representing the content of the image frame 128. Electronic switch means are indicated at 131 and 132 for operation in synchronism with the movement of the record medium 125, such that the first field produced by photocell 121 from the scanning of image 128 is supplied to output line 135, after which the switch means 131 and 132 assume the alternate switching position, so that the second field produced by scanning of image frame 128 at photocell 122 is also supplied to the output line 135. Similarly, the two fields produced by scanning of image frame 127 will be supplied to output line 136.

By interlacing two different image sequences on the record 125, conventional television signals with respect to each series can be produced at the respective outputs 135 and 136.

In FIG. 5, which has a simple optical system, record 125 is shown in its correct edgewise orientation (a side view of the record being shown in FIG. 4 to illustrate the nature of the recorded image frames such as 127 and 128). In FIG. 5, a transducer 140 has an electron beam 141 which is selectively switchable to a first path indicated at 142 and to a second path indicated at 143 by means of a conventional vertical positioner component 144 connected with vertical positioning coils such as indicated at 145. An example of a dual trace vertical positioner such as indicated in FIG. 5 is the Tektronix (Portland, Oregon) Type 53/54C dual trace preamplifier used with their 545A oscilloscope. The positioner 144 is triggered by a distinctive vertical rate pulse supplied at lead 146, at which time it changes the vertical position of the beam from the path 142 to the path 143 or vice versa by changing the current in coils such as indicated at 145, or by changing the voltage on the deflecting plates of the cathode ray tube if electrostatic deflection is used. With the electrons following the first beam path 142, a light beam is emitted from the fast decay time phosphor end wall 147 along a light beam path 148 passing through lens 149. The beam passes through an element of a region such as indicated at A on the record medium 125, and if the particular element of the image is translucent follows a path such as indicated at 150 to impinge on photocell 152. In the alternate position of the electron beam where it follows the path 143, the light path extends as indicated at 153 through lens 149 to scan a segment on the record 125 such as indicated at A′ which has moved to the upper scan position. The transmitted light then follows a path as indicated at 154 to impinge on the photocell 152 having a common output line as indicated at 156. The successive field signals produced by the transducer 140 may correspond essentially with the successive field signals produced at output 136 in FIG. 4. Since the electron beam 141 follows only one of the paths 142 and 143, image frames of the alternate series such as those at B and B′ will not be electrically reproduced when the system of FIG. 5 is locked to the sequence described. It may be switched to the B B′. . . series by locking on one frame ahead or behind. A conventional horizontal scan signal generator is indicated at 158 for supplying horizontal deflection coils 160 and 161.

As in the embodiment of FIG. 4, the scanning paths 148 and 153 intersect the record medium 125 at points which are preferably separated by a distance d which differs from the frame to frame distance D by h v/2 where h is the period of the horizontal scanning signal from component 158 (the reciprocal of the horizontal scanning frequency), and v is the velocity of movement of the record 125 in the direction of arrow 123.

Referring to FIG. 6, the record path for transducer 170 may correspond essentially to that illustrated in FIG. 5. Horizontal deflection of electron beam 171 is produced by means of deflection coils 712 and 173 in a manner similar to that described for FIG. 5. With the vertical position of the electron beam 171 indicated, a light beam emanates from end wall 175 along a path 176 at a level designated by the numeral 1 in FIG. 6. Other levels are designated by numerals 2, 3, 4, 1′, 2′, 3′, 4′. The current supplied to the vertical deflection coils such as indicated at 177 is such that the beam 171 is deflected progressively from level 1 to level 1′ during a first series of horizontal scans to scan a region on the record medium such as indicated at A1 in FIG. 6. A first instantaneous position of the record medium is designated 180–1 in FIG. 6 and corresponds to the instantaneous position if the electron beam 171 indicated in FIG. 6. Other positions of the record 180 are diagrammatically indicated at 180–2, 180–3, 180–4, 180–5 and 180–6. As the record member moves longitudinally along a record medium path such as indicated by arrow 181 between the positions 180–1 and 180–2 as represented in FIG. 6, the electron beam 171 progressively scans from the level 1 to the level 1′, the vertical extent of this sweep being indicated at 191 in FIG. 6.

With the record at the position indicated at 180–2, the electron beam 171 returns to level 2, and begins a scanning cycle moving progressively from level 2 to level 2′. The vertical extent of this second sweep cycle is indicated at 192. Because of the rate of movement of the record medium in the direction of arrow 181, it will be observed that the record has been scanned twice at the region A1 thereof. Similarly on a third sweep of beam 171, the beam moves progressively from level 3 to level 3′ as the record member moves from position 180–3 to 180–4. Further, as the record moves from position 180–4 to position 180–5. The beam 171 scans from level 4 to level 4′. At this time the continuously moving record has been scanned four times in the region A1.

When the record reaches the position indicated at 180–5, the beam 171 returns to level 1 which is the position indicated in FIG. 6, to begin scanning a region A2 on the record medium, the previous shifting of scanning levels of the beam 171 then being repeated.

Figure 7:
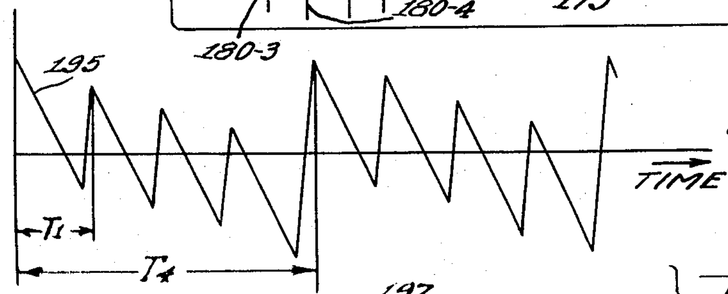
FIG. 7 is a diagrammatic illustration of an electrical positioning waveform for causing the beam to sweep in a predetermined pattern with respect to the direction of movement of the record medium in the embodiment of FIG. 6.
Figure 8:
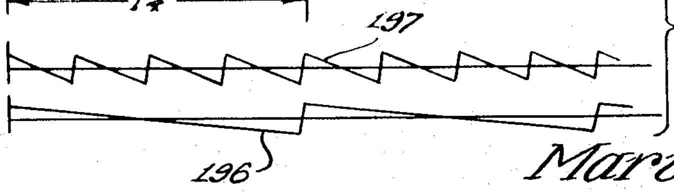
FIG. 8 is a diagrammatic illustration showing the individual repetitive waveforms into which the complex waveform of FIG. 7 may be analyzed.

FIG. 7 indicates a vertical scanning waveform 195 suitable for producing the type of scanning of the scanning beam 171 just described, and FIG. 8 shows an analysis of the waveform 195 into component waveforms 196 and 197 which waveforms 196 and 197 may be generated by conventional sweep circuits superimposed to produce waveform 195.

Thus in operation of the embodiment of FIG. 6, a record medium moves along a path such as indicated by arrow 181 at a constant speed such that the record medium moves a distance corresponding to the separation between levels 1 and 2, for example, as indicated at the end face 175 of transducer 170, during an interval such as represented by T1 in FIG. 7. During this interval, the scanning beam 171 scans over a vertical extent such as indicated at 191 in the diagram of FIG. 6. In the time interval T1, the record moves from a position such as indicated at 180–1 in the diagram to a position such as indicated at 180–2. Over the time interval T4 which is equal to four times T1, referring to FIG. 7, the record moves from a position such as indicated at 180–1 to a position as indicated at 180–5, and a given optical image on the record such as at the region A1 is effectively scanned four times.

The raster generated on face 175 by beam 171 may be registered with the film by running the film against the face; a fiber optics faceplate is then helpful in concentrating the light. Or a lens system with any desired ratio may be used as in FIG. 5.

While FIGS. 4 and 5 have been described for an optical system, the principles apply also to magnetic line scanners as in Camras U.S. Pat. No. 2,900,443, electrostatic line scanners as in Camras U.S. Pat. No. 3,040,124, etc., where two (or more) spaced line positions are provided, with a selector for each line. Similarly, the scanners in FIGS. 1, 2, and 3 may be line scanners of transverse information on magnetic, electrostatic, or other records, preferably in a picture-like format. See for example Camras U.S. Nos. 2,900,443, 3,040,124, 3,318,997, 3,382,325 and 3,382,326.

Having described the illustrated systems generally, the following specific examples may be given as concrete embodiments.

EXAMPLE I

In one embodiment in accordance with FIG. 1, scanners 10 and 11 may be magnetic transducer heads in scanning relation to the same narrow track on record medium 12 which has a magnetizable layer in sliding relation to the transducer heads 10 and 11. The video picture sources may supply standard U.S. demodulated television signals, with alternate fields of the respective signals magnetically recorded on the magnetizable layer in alternating sequence as represented in FIG. 1. Components 21 and 22 may be electronic gate circuits capable of transmitting the composite demodulated video signal in accordance with U.S. standards and sequentially activated by means of a flip-flop circuit as previously described.

During playback a similar procedure is followed with the selector switches 15-20 in the playback (P) positions. During playback the magnetic head 10 scans each recorded field after which the magnetic head 11 scans the same recorded field, so that each recorded field produces two successive field signals which are supplied to the same display device such as 33 in FIG. 1.

EXAMPLE II

Where only the recording function is required the magnetic recording apparatus of Example I may be simplified as in FIG. 2. Here only a single magnetic transducer head 40 and electronic gate type switch are required to produce the magnetic recording as referred to in Example I.

EXAMPLE III

Where only the playback function is required for the embodiment of Example I, permanent connections can be provided in FIG. 1 corresponding to the P or playback positions of the switches 15–20. Switches 15–20 are then, of course, omitted. Also omitted are sources 31 and 32. Where simultaneous displays of the signals from playback heads 10 and 11 are not necessary, display 34 and electronic switch 22 are also omitted. Either sequence A, A′, etc. or B, B′, etc. may then be viewed on display component 33 by setting the controller 23 so that the electronic switch 21 operates in step with one recorded sequence or the other. Alternatively, a switch is used to connect display 33 during a given playback operation of the system either with the output of switch 21 or with the output switch 22 (which then would be included in the system). When display 33 is connected with output of selector 21, sequence A, A′, etc. would be displayed, while with display 33 connected to the output of switch 22, the sequence of fields B, B′, etc. would be displayed.

EXAMPLE IV

The simplified single magnetic transducer head 40 of Example II can be utilized for playback where components 47 and 48 are display units. Preferably the display units have a storage and delay system which stores the information of a picture field while the electronic switch 44 is connected to component 47 for example and which repeats this information to component 47 while the electronic switch is connected to component 48. Similarly for component 48, so that each display shows 60 fields per second under U.S. standard broadcast television practice, of which 30 fields are new, interspersed with 30 repeated fields. As previously mentioned a suitable storage system is a magnetic disk or drum forming parts of components 47 and 48, each of which records, plays and then erases while a new record is made.

EXAMPLE V

The record medium 12 of FIG. 1 or 41 of FIG. 2 may alternatively have one set of picture fields A, A′, etc. disposed in a forward scanning sequence with the record medium moving in the direction of arrow 13 or 42, while the other set of picture fields such as B, B′, etc. would be magnetically recorded in a reverse sequence. This may, for example, be accomplished with the embodiments of Example I by having source 32 supplied during recording by a backwards running track of a video tape while source 31 is fed by a forward running track from the same video tape, (See Camras U.S. Pat. No. 2,702,833), the pickup heads of these tracks being adjusted so that the vertical sync intervals occur together. An alternative method is to first record the picture sequence A, A′, etc. while the tape runs in the direction of arrow 13 and then to record the pictures B, B′, etc. in between the fields A, A′, etc. while the tape runs in the opposite direction from the arrow 13. Another alternative is magnetic contact printing such as disclosed in may U. S. Pat. Nos. 2,747,026 and 2,747,027, or photographic processes where the backward and forward interspersed segments of information are recorded on he record film. The record of such as embodiment has the feature that rewinding is not necessary since the sequence A, A′, etc. is shown in the forward direction of motion of the record; then when the end of the tape is reached, the tape is reversed to display the sequence B, B′, etc. This concept may be extended to 3, 4 or more sequences on the same track of the record or with parallel tracks of this kind. For example on track number 1 having three interlaced sequences the magnetic playback head may reproduce the sequence A, A′, etc. during forward motion of the record, and reproduce the sequence B, B′, etc. during reverse motion of the tape, and then reproduce a third sequence such as indicated at C′ in FIG. 3 during forward scanning of the record. The system may then switch to track number 2 and play backwards a sequence which may be designated D, D′, etc. then play with forward motion of the tape a sequence E, E′, etc. and then reproduce a sequence F, F′, etc. during a further reverse motion of the tape. After playing the sequence F, F′, etc. the system is ready to change back to track number 1 and repeat the process.

EXAMPLE VI

FIG. 3 shows how the principles of Example I are extended to three interspersed recordings. The controller 80, in response to sync pulses of the standard demodulated U.S. video signal, steps all of the switches to their next position as indicated by the arc shaped arrows. The connections for a given switching condition remain during the picture interval of the video signal and changeover is made during a blanking period of the video signal.

For magnetic recording, sources 75–77 are sources of video recording signals for magnetic recording heads 61–63 (which may have individual driver circuits if desired). Switches 91–96 remain open during recording. Signals A′, B′ and C′ are recorded on magnetic tape 64 as the tape moves continuously in the direction of arrow 65.

For playback, components 75–77 operate as video display units which may include amplifiers, equalizers and cathode ray tubes with conventional sweep, sync and power supply. All of the switches 91–98 are closed. Component 75 displays the following sequence, picture field A picked up by playback head 61, field A reproduced by head 62, field A reproduced by head 63, field A′ reproduced by head 61, field A′ reproduced by head 62 and so on. Adjusting screws 101 and 102 change the longitudinal position of magnetic transducer heads 62 and 63 to compensate for tape shrinkage or variations between one recorder and another as previously described. Although only 20 different fields per second are recorded (out of an original 60 available fields per second) each field is scanned three times to yield 60 fields per second on playback. Flicker is not a problem, and the motion does not become jerky as long as about 16 different pictures are displayed per second. This means that four interspersed sequences are quite satisfactory where the field rate is 60 per second, and more sequences are allowable if some jerkiness is tolerable. A four sequence recording and playback system would use four-position switches. More sequences can be added using the principles outlined here, or not all components that are built in need be used; for example only heads 61 and 62 of FIG. 3 could be programmed to record and/or play with respect to a magnetic recording tape having only two sequences arranged as shown in FIG. 1. Switches 71 and 72 would then operate in a manner similar to that described with respect to the electronic switches in FIG. 1. That is the electronic gates represented by switches 71 and 72 would provide the operation represented by switches 21 and 22 in FIG. 1 by suitable circuit adjustment for example as determined by the position of a manual selector switch.

EXAMPLE VII

All of the recordings in FIG. 3 may be made with head 61 by opening switches 93–98 (removing from the circuit heads 62 and 63 and switches 72 and 73). This is analogous to Example II. With such a system, playback would operate preferably by filling in with a two field storage device, analogous to that described in Example II.

Examples I through VII comprehend the use of single gap serial scanning magnetic transducer heads such as disclosed in my applications for patent U. S. Ser. No. 401,832 filed Oct. 6, 1964, now U.S. Pat. No. 3,495,046, U. S. Ser. No. 493,271 filed Oct. 5, 1965, now U.S. Pat. No. 3,531,600, and U. S. Ser. No. 649,256 filed June 27, 1967. Examples I through VII also comprehend plural channel color video magnetic transducer heads as disclosed in my applications U. S. Ser. No. 439,340 filed Mar. 12, 1965, now U.S. Pat. No. 3,502,795, U. S. Ser. No. 528,934 filed Feb. 21, 1966 and now abandoned and Ser. No. 649,256 filed June 27, 1967. Alternatively Examples I through VII may be applied to transverse scan magnetic transducer heads such as disclosed in my U.S. Pat. Nos. 2,900,443, 3,382,325, 3,382,326 and 3,318,997.

With serial scan head units each line of the video signal would be recorded serially along the length of the record tape, the tape moving at a relatively high speed such as 60 inches per second. For color video recording, each serial scan magnetic transducer head unit would scan a separate channel. The two or three head units would be aligned in the direction at right angles to the direction of movement of the record tape.

EXAMPLE VIII

Scanners 10 and 11 of FIG. 1 or 61–63 of FIG. 3 can be transverse scan heads such as disclosed for example in Camras U.S. Pat. No. 2,900,443 which records the picture information along lines that extend from edge to edge of a tape. Each lateral scan can correspond to one or more horizontal lines of a television field. Switching from one scanner or video unit to another is made at the end of each field in the same manner as referred to with respect to Example VI. Special means such as servos are ordinarily necessary to insure registration of the track with the scanners.

EXAMPLE IX

Recordings are made in the form of two dimensional pictures or patterns each of which is continuous in both dimensions (without scan lines). The pictures may be magnetic, electrostatic, optical, chemical, etc. Taking optical as an example (since this is the most familiar), the set of fields at A, A′, etc. in FIG. 3 may be sequences of 8 millimeter (or smaller) pictures on a photographic film strip 64, printed from a movie master that was photographed at 20 frames per second. Spaces are left between each frame at A. A′, etc. on the photographic strip 64 to allow printing of sequences B′, etc. and C′, etc. as indicated in FIG. 3.

To playback such a photographic print, displaying it on a television screen, heads 61–63 of FIG. 3 are flying spot (cathode ray tube) scanners. Such scanners have a fine spot of light which sweeps horizontally across the film, then returns for another scan, all in accordance with television standards (15,750 sweeps per second for U.S. standards). The film 64 moves continuously so that each frame is swept horizontally about 262.5 times before the next frame is in a corresponding position The reflected (or transmitted) light is picked up at the scanning line, converted to an electric signal, and amplified, to become the output of the scanner. The outputs of scanners 61–63 are connected to switches 71–73 and from the switches to display units of video components 75–77. A common sync is used for the scanners, switches, and display units to keep then locked together. Unlike the embodiment of Example VIII, in Example IX no means for horizontal registration are required, and no degradation of vertical resolution takes place when the adjustments of screws 101 and 102 are made so that scanners 61-63 produce interlaced lines of information from the recorded images.

For 60 hertz television standards, a signal with 15 new fields per second (each displayed four times) is satisfactory to give 60 fields per second. Where commercial power is at 50 hertz as in Europe and the television standard is correspondingly adjusted, reproduction with 16⅔ new frames per second is recommended (1 to 3 ratio), though a 1 to 4 ration may be possible in some cases. The result is 50 fields per second by repetition. As previously indicated, the principles of FIG. 3 are extendable to more or less than three sequences. The rotary switches in FIG. 3 are symbolic; a convenient system is the use of a set of gates, for example logical AND gates, common in computer technology, turning them on and off during the vertical blanking interval, as previously described, to connect the circuits as indicated in FIG. 3.

EXAMPLE X

The embodiment of FIG. 4 may comprise an optical scanner for two simultaneous displays. In this embodiment a complete image or frame has been recorded at each successive location as indicated at 127 and 128 as a complete instantaneous representation of an event such that the recorded images have two dimensional continuity this being true also in Example IX. The concept of two dimensional continuity can be best explained by comparing it with the situation where a moving event is scanned along sequential lines to generate interlaced fields. With interlaced fields, there is a time interval of 1/60th second between the sensing of light intensity at a given point in one field and the subsequent sensing of a vertically adjacent point of a subsequently scanned interlaced field. The result is that the two adjacent points are not shown in their instantaneous relationship at a given instant of time, but are shown with a time displacement of 1/60th second. Thus a certain distortion or discontinuity occurs in the representation of an event by interlaced fields, and the term two dimensional continuity is utilized to refer to a simultaneous complete frame recorded on a record medium as distinct from a frame made up of two sequentially scanned interlaced fields. The essential point in FIG. 4 is the provision of recorded frames which have two dimensional continuity on the record medium, and such a record may be scanned optically as indicated in FIG. 4 or by electron beam actuated magnetic scanners such as illustrated in Camras U.S. Pat. Nos. 2,900,443 and 3,318,997. With such reproducing systems, the record would have magnetically recorded images with two dimensional continuity. In each example, the electron beam scans horizontally according to U.S. broadcast television standards, to control the scanning of respective frames such as 127 and 128 for production of interlaced field signals. With optical scanning as illustrated in FIG. 4, the electron beam excites a moving dot of light along a horizontal line across the face 130 of the cathode ray tube 110 which is coated with a fast responding phosphor. The light is optically imaged and split by mirrors and lenses as shown, the direct ray being focused along path 113 and the reflected ray being focused along path 117, to impinge on the film as two fine beams moving in parallel across the width dimension of the film. The spacing between the paths 113 and 117 is preferably one frame distance plus or minus the distance between a pair of interlaced horizontal lines as traced by the light beams on a given frame. An adjustment for setting the exact distance between beams is desirable. Photocell 121 is provided with a mask to receive only the transmitted light from the scan along the upper path 113, while the scanning beam operating along the path 117 impinges only on the photocell 122.

EXAMPLE XI

Where only one program is to be displayed, the arrangement of FIG. 5 may be used. The horizontal scanning takes place in a cathode ray tube 140 at the U.S. standard horizontal rate of about 15,750 horizontal scanning lines per second. The light output from the cathode ray tube is transmitted to a photomultiplier 152, the electrical signal being amplified and connected to an output display device whose scanning beam moves in synchronism with that of the cathode ray tube 140. The image frames as in Examples IX and X have two dimensional continuity, and are produced for example by exposing each location on the film to a complete instantaneous image of a moving event. When the film 125 has moved in the direction of arrow 123 so that the scanning path 153 shown in dashed line intersects the end of frame B′ in FIG. 5, a sync signal reproduced from the film 125 triggers the vertical positioner 144 via conductor 146, changing its output current to the deflection coils such as 145, and correspondingly setting the scanning beam to produce scanning along the light path indicated at 148 in FIG. 5. The beginning of frame B′ has now reached the point where it is horizontally scanned by means of the light beam along path 148. As the film 125 continues to move in the direction of arrow 123, the rest of frame B′ is scanned again, preferably in between the previously scanned portion of the frame. The spacing of the points of intersection of the light paths 148 and 513 with the film relative to a frame length can be selected by adjusting the exact vertical beam position corresponding to path 142. At the completion of the second scan of the frame B′, frame B″ is located properly for its first scan by means of the beam scanning along path 153. To "tune in" on the series of frames A, A′, etc., the vertical positioner 144 is stepped over one count in relation to the vertical signal that occurs at the end of each scanned frame. The system of FIG. 5 would then scan the A series of frames and reproduce the sync pulses which are reproduced during scanning near the end of these frames.

The system may be used for more than two series of recorded video signals by providing more than two vertical positions.

EXAMPLE XII

In the embodiment shown in FIG. 6, the film moves in the direction of arrow 181 at a speed such that 15 frames pass a fixed point every second, while the television system displays 60 fields per second, the arrangement being similar to that in FIG. 5. The film moves continuously while the flying spot scanner 170 has a combined horizontal and vertical deflection. The horizontal scanning rate is the standard 15,750 scans per second, but the vertical movement is special and corresponds to the vertical deflection waveform shown in FIG. 7. In this embodiment in 1/15th second the given frame on the film moves past a fixed point, but in this time the frame is scanned four times. This is accomplished by deflecting the beam 171 from position 1 to position 1′ in 1/60th second, then quickly returning the beam to position 2 for the second vertical deflection from position 2 to position 2′ in the next 1/60th second. Similarly the beam is deflected from position 3 to position 3′ and from position 4 to position 4′. The exact timing of the faster vertical sweep component represented by waveform 197 in FIG. 8 is preferably such that every other sweep differs from the preceding one, giving interlaced scanning.

It will be understood that for each of the embodiments of Examples I through XII, the general arrangement and operation will be as specifically described with respect to the corresponding figure of drawings. The specific scanning rates and other numerical data given in the examples are, of course, only by way of illustration and not by way of limitation, since the systems of the present invention may be adapted to other television standards and for special systems and the like.

In general where the channel of the record has N signals interleaved thereon and where M is the number representing the field repetition rate (such as 50 or 60) in fields per second, the system is such that each recorded field is displayed N times to provide an essentially continuous sequence of M fields per second at each display. The ratio of M to N is preferably at least about 15.

If the system of FIG. 2 is used for reproducing in conjunction with a repeater device (or delay unit), a preferred location for the device is with its input connected to conductor 200 in FIG. 2 and with switch 44 replaced by a double pole double throw switch. The double pole double throw switch would, during scanning by scanner 40 of field A for example of record 12, transmit the reproduced field A directly to component 47 and transmit previously recorded field B as delayed 1/60 second by the repeater device to component 48. When scanner 40 was scanning field B′, the delayed field A would be transmitted to component 47 and the field B′ from scanner 40 would be directly transmitted to component 48. Thus line 200 could be connected to a recording head of a disk type delay unit, and the reproduce head introducing the 1/60 second delay would be connected to one input terminal of each switch unit of the double pole double throw switch, the conductor 200 being connected to the other input terminals.

The present invention allows a higher speed of the record medium, giving better high frequency response from linear (serial) records (that are not side scanned) and yet achieves economy of recording. For example a given record moving at 60 inches per second might have an upper frequency response of 2.0 MHz. and a total of 1 hour (two interleaved half hours) of programming according to the method outlined here. With the conventional system the same amount of tape would have to run at 30 inches per second to obtain an hour of recording and the upper frequency limit would be only 1.0 MHz.

While the scanning of segments such as video frames or fields has been referred to, serially recorded lines of different signals can be interleaved, using the recorded horizontal sync pulses to control electronic switching during reproduction. The results is a finer interleaving, line by line, instead of frame by frame. In a given sequence of two records every other line is omitted during recording, while every recorded line is played back twice.

The term "conventional controller" is used herein since the component circuits are known and may be interconnected as explained herein entirely as a matter of routine and using conventional signal distribution techniques as found in related arts. Reproduced sync pulses at 37 or 38, or at 37 and 38 in FIG. 1, at 201 in FIG. 3 (and a similar line from conductor 200 to controller 45 in FIG. 2) may be taken as control lines for supplying suitable reproduced sync pulses to regulate the controller 23, 45 or 80 during playback as herein explained.

Where there are two interleaved recordings each field of the second recording is preferably followed by a distinctive vertical sync signal, as for example a pulse that is longer than the pulse following each field of the first recording. A vertical sync separator of the conventional type but with a longer time constant distinguishes the second series of pulses and triggers the controller so that the second sequence is always connected to its correct display unit. Such use of a distinctive signal insures against losing count in case of a disturbance. Similarly, where there are more than two interleaved recordings at least one of the series is preferably distinguished by a distinctive sync signal.

In the embodiment of FIG. 6, where a single track having a serial recording is to be reproduced, a rotary head assembly can be used in place of scanner 170. In this case, a first head on the rotary assembly would scan along the record track at location 191, a second head would scan along the record track at the location indicated at 192, and third and fourth heads would traverse the record track at locations 203 and 204. The first head would then scan the record track along the location represented at 205 in FIG. 6, (the same location in space as location 191), to begin a new scanning cycle. The rotary heads would be mounted at different angular positions about a common axis of rotation such that the first head would move out of scanning relation to the track (or have its output blanked) just as the second head began its scanning engagement with the track, and similarly for the succeeding head passes.

Rotary head apparatus for scanning a serial recording is shown in my pending application Ser. No. 627,756 filed Apr. 3, 1967. Two and four scans per segment are shown in Table II of this application with head motion opposite to the tape motion. Also two scans per segment with head motion in the same direction as tape motion is shown. Similarly with the scanner 170 of FIG. 6, the vertical scanning direction can be opposite to the direction of tape motion. The beam 171, FIG. 6, as well as beam 127, FIG. 4, and beam 141, FIG. 5, may be blanked out during return sweeps as is customary in television scanning. With the embodiments of the present invention the number of recorded segments moving past a fixed point would correspond to the normal rate of motion of the original program, while in the embodiments of Table II of the prior application, the rate of motion of the reproduced signal is different, actually slow motion, relative to the original program.

It will be apparent that many modifications and variations may be effected without departing from the scope of the novel concepts of the present invention.

In FIG. 6, as a preferred embodiment, when the vertical component of the scan moves opposite to the direction of record motion, the beam 171 starts in vertical position 206, in line with the start of $A_1$ at position 180–1. By the time the record has advanced to position 180-2 the beam has moved vertically upwards to position 2 where it is at the end of $A_1$ at position 180–2. A quick return of the beam brings it down to 1′, which corresponds to the beginning of $A_1$ while the film is at 180–2. While the beam deflects upwards to position 3 the film moves to position 180–3. Again the segment $A_1$ has been completely scanned vertically, and the beam returns quickly to position 2′ to begin the third scan from 2′ to 4. Similarly, in the fourth scan the beam moves from 3′ to 206. The cycle is now complete, the beginning of the next frame $A_2$ is now in line with 206, and the next scan cycle of $A_2$ is exactly as described for $A_1$.

The excursion of the scanner is seen to be less than the length of a segment $A_1$ (three/fourths as long in this example) when the scanner moves opposite to the record. In the other case where the scanner moved in the same direction as the record, the vertical excursion was greater than the length of the record (five/fourths as long in the example).

It will be noted that with this type of deflection the current supplied to deflection coil 177 is the same at the beginning and end of a vertical scanning cycle as represented by interval $T_4$ in FIG. 7. To provide this type of vertical deflection waveform, the component waveform 197 of FIG. 8 would be inverted relative to its horizontal axis in FIG. 8 (polarity reversed) so that waveforms 196 and 197 together would give a zero current at the beginning and end points of the interval $T_4$ in FIG. 7.

I claim as my invention:

1. Apparatus for producing electrical video signals comprising
   a record medium having a channel with recorded simultaneous complete images having two dimensional continuity disposed therealong,
   means for moving the record medium in a direction of movement continuously during reproducing operation,
   scanning means for scanning the channel of the record medium along successive lines transverse to the direction of movement at respective first and second scanning positions to generate first and second series of video field signals, and
   means for connection with said scanning means during reproducing operation for transmitting said first and second video field signals to a common output,
   said second scanning position being offset from the first scanning position in the direction of movement by a distance related to the speed of movement of the record medium such that the scanning means scans at the second scanning position between the lines scanned by the scanning means at the first scanning position, the common output receiving a series of interlaced video field signals in accordance with the successive frames on the record medium.

2. Apparatus for electrically reproducing a video signal comprising a record medium having a series of simultaneous complete frames recorded therealong,
   means for moving the record medium in a direction of movement continuously during reproducing operation, with the recorded frames moving past a given point at a rate of M/N frames per second where M is an image repetition rate and N is greater than one, and M/N is at least about fifteen,
   scanning means for scanning the channel of the record medium at N successive locations along the record medium path to produce a series of video field signals, and
   means comprising said scanning means for scanning each record frame N times as it moves past the scanning means.

3. Apparatus according to claim 2 with the scanning means having a component of motion along the direction of movement of the record medium.

4. Apparatus according to claim 2 with said scanning means scanning along successive lines transverse to the direction of movement and said locations being displaced from each other in the direction of movement by a distance related to the speed of movement of the record medium such that the scanning means scans different lines on the recorded frame at certain of the respective locations.

5. The method of transducing a plurality of video programs which comprises
   supplying a record medium with recorded simultaneous complete area-format picture frames related to a number N of respective different programs recorded at successive regions along the same channel of the record medium, where N is greater than one, and with the regions receiving the recorded picture frames of the N respective programs alternating in a predetermined sequence with respect to the channel scanning direction,
   moving the record medium in a direction so as to move the channel past a given scanning location for scanning of the channel in the scanning direction,
   scanning each of the recorded picture frames related to a common program N times to generate N reproduced fields occurring in time sequence and to provide a total of M such reproduced fields per second, with N having a value such that M/N is at least about 15, and
   supplying such reproduced fields relating to said common program to a display device to provide a display of the common program at the display rate of M reproduced fields per second which is substantially free of flicker and yet wherein motion of the event is essentially smooth.

6. Apparatus for producing electrical video signals comprising
   a record medium having a channel with recorded simultaneous complete picture frames disposed therealong the frames each occupying a rectangular area on the record medium and each point on said area representing a corresponding point on a two dimensional image,
   means for moving the record medium in a direction of movement during reproducing operation,
   scanning means for scanning the channel of the record medium along successive lines transverse to the direction of movement at respective first and second scanning positions to generate first and second series of video field signals, and
   means for connection with said scanning means during reproducing operation for transmitting said first and second video field signals to a common output, said second scanning position being offset from the first scanning position in the direction of movement by a distance related to the speed of movement of the record medium such that the scanning means scans at the second scanning position between the lines scanned by the scanning means at the first scanning position, the common output receiving a series of interlaced video field signals in accordance with the successive simultaneous complete picture frames on the record medium.

7. The method of transducing a video signal which comprises supplying a record medium with recorded photographic picture frames related to a series of images of an event recorded at successive regions along the same channel of the record medium, with the regions receiving the recorded photographic picture frames of the event being arranged for sequential scanning with respect to the channel scanning direction, moving the record medium in a direction so as to move the channel past a given scanning location for scanning of the channel in the scanning direction with successive recorded photographic picture frames related to said event moving past the scanning location at a rate of substantially M/N images per second where M is a given image repetition rate and N is selected such that M/N is at least about 15, and optically scanning each recorded photographic picture frame of the video event a number N times as it travels past the scanning location to supply a reproduced image signal having a repetition rate of M images per second so as to be substantially free of flicker and yet wherein motion of the event is essentially smooth.

8. Apparatus for electrically reproducing a video signal comprising a record medium having a series of complete area-format picture frames recorded therealong, each occupying a dimension D of the length of the record medium, means for moving the record medium in a direction of movement during reproducing operation, with the recorded frames moving past a given point at a rate of M/N frames per second where M is an image repetition rate and N is greater than one, and M/N is at least about 15, scanning means for scanning the channel of the record medium at N successive locations which are offset from each other along the record medium path by a distance D/N to produce a series of video field signals, and means comprising said scanning means for scanning each complete area format picture frame N times as it moves past the scanning means.

9. Apparatus according to claim 8 with the scanning means scanning transversely at a relatively rapid scan rate and scanning in the direction of motion of the record medium at M cycles per second, and the scanning means begins each of N successive cycles at points successively offset in the direction of motion of the record medium by the distance D/N.

10. Apparatus according to claim 8 wherein the scanning means scans interleaved lines on the complete area format picture frame during certain of the successive scans thereof.

* * * * *